US012782972B2

(12) United States Patent
Ho et al.

(10) Patent No.: US 12,782,972 B2
(45) Date of Patent: Nov. 3, 2026

(54) MOBILE SECURITY ROBOT SYSTEM WITH ROBOTIC ARMS AND WATER CANNONS AND METHOD FOR DETERRING CRIMES USING THE SAME

(71) Applicants: Ching-Tien Ho, San Jose, CA (US); Theodore Lee, San Jose, CA (US); David Fong, Sunnyvale, CA (US)

(72) Inventors: Ching-Tien Ho, San Jose, CA (US); Theodore Lee, San Jose, CA (US); David Fong, Sunnyvale, CA (US)

(73) Assignee: Agape-1 Technology Inc., San Jose, CA (US)

(*) Notice: Subject to any disclaimer, the term of this patent is extended or adjusted under 35 U.S.C. 154(b) by 42 days.

(21) Appl. No.: 19/172,536

(22) Filed: Apr. 7, 2025

(65) Prior Publication Data

US 2026/0310232 A1 Oct. 8, 2026

(51) Int. Cl.

| | |
|---|---|
| ***B25J 17/02*** | (2006.01) |
| ***A62C 31/00*** | (2006.01) |
| ***A62C 31/05*** | (2006.01) |
| ***B25J 11/00*** | (2006.01) |
| ***B25J 15/00*** | (2006.01) |
| ***B60S 3/04*** | (2006.01) |
| ***G05D 1/689*** | (2024.01) |
| *G05D 105/10* | (2024.01) |
| *G05D 105/35* | (2024.01) |

(52) U.S. Cl.

CPC ......... *G05D 1/6895* (2024.01); *A62C 31/005* (2013.01); *B25J 11/002* (2013.01); *B25J 15/0019* (2013.01); *B25J 17/0283* (2013.01); *B60S 3/04* (2013.01); *G05D 2105/10* (2024.01); *G05D 2105/35* (2024.01)

(58) Field of Classification Search

CPC ............. G05D 1/6895; G05D 2105/10; G05D 2105/35; A62C 31/005; B25J 11/002; B25J 15/0019; B25J 17/0283; B60S 3/04

See application file for complete search history.

(56) References Cited

U.S. PATENT DOCUMENTS

| | | | | |
|---|---|---|---|---|
| 9,381,961 | B1 * | 7/2016 | Kataoka | B25J 5/00 |
| 9,475,191 | B1 * | 10/2016 | Urata | B25J 9/0006 |
| 9,561,829 | B1 * | 2/2017 | Urata | B62D 57/032 |
| 9,623,556 | B1 * | 4/2017 | Urata | B62D 57/032 |
| 9,789,603 | B2 * | 10/2017 | Jacobsen | B25J 13/025 |
| 10,793,047 | B1 * | 10/2020 | Theobald | B25J 9/1687 |

(Continued)

*Primary Examiner* — Tyler J Lee

(57) ABSTRACT

A mobile security robot system comprising a robotic arm and a water cannon system, which can be deployed on an autonomous vehicle to perform various security, maintenance, and emergency functions. The robotic arm system is characterized by precise multi-axis movement, allowing it to aim the water cannon at a desired location and distance. The water cannon system can be preloaded with water or various mixtures for various purposes of applications. A control software module integrates with the navigation system and an AI-based threat detection system to direct the robotic arm and water cannon based on the robot's location, speed, and target destination. This invention offers a flexible and efficient solution for a variety of tasks, including crime deterrence, firefighting, street cleaning, and vehicle maintenance, while also being adaptable to stationary and mobile configurations.

10 Claims, 2 Drawing Sheets

(56) References Cited

U.S. PATENT DOCUMENTS

| | | | | |
|---|---|---|---|---|
| 10,814,484 | B2 * | 10/2020 | Preisinger | G05B 19/423 |
| 12,240,118 | B2 * | 3/2025 | Mancuzo | B25J 9/1633 |
| 12,420,426 | B2 * | 9/2025 | Duknic | B25J 11/0005 |
| 12,428,243 | B1 * | 9/2025 | Polido | B65G 47/918 |
| 2010/0158656 | A1 * | 6/2010 | Seavey | B25J 19/023 414/744.5 |
| 2013/0200680 | A1 * | 8/2013 | Cho | E21D 9/1053 299/1.4 |
| 2018/0236666 | A1 * | 8/2018 | Mozeika | B25J 9/1689 |
| 2020/0032651 | A1 * | 1/2020 | Theander | E02F 3/963 |
| 2020/0223069 | A1 * | 7/2020 | Tan | B25J 9/1625 |
| 2021/0031376 | A1 * | 2/2021 | Lindemann | B25J 15/0066 |
| 2021/0353311 | A1 * | 11/2021 | Lavallee | A61B 17/1675 |
| 2022/0347835 | A1 * | 11/2022 | Majetic | B25J 5/005 |
| 2023/0041079 | A1 * | 2/2023 | Thompson | B05B 13/0431 |
| 2024/0190014 | A1 * | 6/2024 | Haley | B25J 11/002 |
| 2025/0348085 | A1 * | 11/2025 | Ho | G05D 1/243 |
| 2025/0360624 | A1 * | 11/2025 | Hansen | B25J 9/1687 |

* cited by examiner

MOBILE SECURITY ROBOT SYSTEM WITH ROBOTIC ARMS AND WATER CANNONS AND METHOD FOR DETERRING CRIMES USING THE SAME

FIELD

The present invention relates to the field of mobile security robot system, and more particularly to method and devices employed by the security robot, incorporating AI methodologies, sensors, and robotic arms.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Living peacefully in a community without fear of threats from criminals is a universal desire. While police forces work tirelessly to maintain peace, their limited resources can be supplemented by mobile security robots to further enhance the safety and security of individuals and communities. As a result, various types of security robots have been deployed to perform safety and security functions to assist communities. However, there is still significant room for improvement in the functionality of these security robots to better serve the community.

For this reason, a Mannequin Robot System is disclosed in U.S. patent application Ser. No. 18/661,714. The system consists of an autonomous vehicle, a mannequin mounted on the vehicle, and various related sensors and devices for autonomous navigation, security patrolling, and communications. Additionally, a Crime Detection and Deterrence System (CDDS) is disclosed in U.S. patent application Ser. No. 19/060,805. This CDDS includes an AI-based multimodal Large Language Model (LLM) designed to automatically detect potential threats. The AI engine (i.e., the multimodal LLM) can also function as a chatbot engine to communicate with individuals the robot encounters while patrolling the private property it is guarding.

The system processes surrounding audio and video inputs captured by the mobile security robot while patrolling the property. It then analyzes the captured videos, images, and audio using a pre-trained multimodal Large Language Model (LLM) deployed on the robot. When a potential threat is detected, the system engages in intelligent conversations, impersonating a security guard. The system can also communicate remotely with a security guard (a real person) or with local or federal authorities (such as local police departments at the city, county, or state level, or the FBI), depending on the severity and location of the threat.

While the aforementioned Mannequin Robot and CDDS can perform effective security patrols and crime detection to protect the community, a cost-effective mechanism to deter crimes upon detection provides a next-level improvement in community security. Therefore, the purpose of this invention is to provide a Robotic Arm and Water Cannon system for enhanced crime deterrence.

Following the detection of a potential threat using the Mannequin Robot Patent and CDDS systems, the same security robot system can perform effective crime deterrence with its pre-installed robotic arm and water cannon systems. These systems work together to direct highly pressurized water streams to any location within the surrounding area, reaching any distance achievable by the water cannon.

SUMMARY

A mobile security robot system equipped with a robotic arm and a water cannon system is disclosed. This system can be deployed on an autonomous vehicle.

The system can perform various security, maintenance, and emergency functions using the robotic arm and water cannon system while conducting security patrols via its autonomous vehicle platform.

The robotic arm system enables precise multi-axis movement, allowing the water cannon tp be aimed at a desired location and distance. The water cannon can be preloaded with water or various mixtures, such as fire-extinguishing agents, riot control chemicals, or car washing solutions, for different applications.

The system includes a control software module integrated with the navigation system and an AI-based threat detection system. The AI system directs the robotic arm and water cannon based on the robot's location, speed, and target destination.

The mobile security robot system provides a flexible and efficient solution for various tasks, including crime deterrence, firefighting, street cleaning, and vehicle maintenance. It is also adaptable to both stationary and mobile configurations.

Further areas of applicability of the present disclosure will become apparent from the detailed description provided hereinafter. The detailed description and specific examples are intended for illustration only and should not be construed to limit the scope of the disclosure.

BRIEF DESCRIPTION OF THE DRAWINGS

The present disclosure will be better understood from the detailed description and the accompanying drawings, wherein.

DETAILED DESCRIPTION

The following description is merely exemplary in nature and is in no way intended to limit the disclosure, its application, or uses. It should be understood that steps within a method may be executed in different order without altering the principles of the present disclosure unless otherwise specified.

Figure 1:
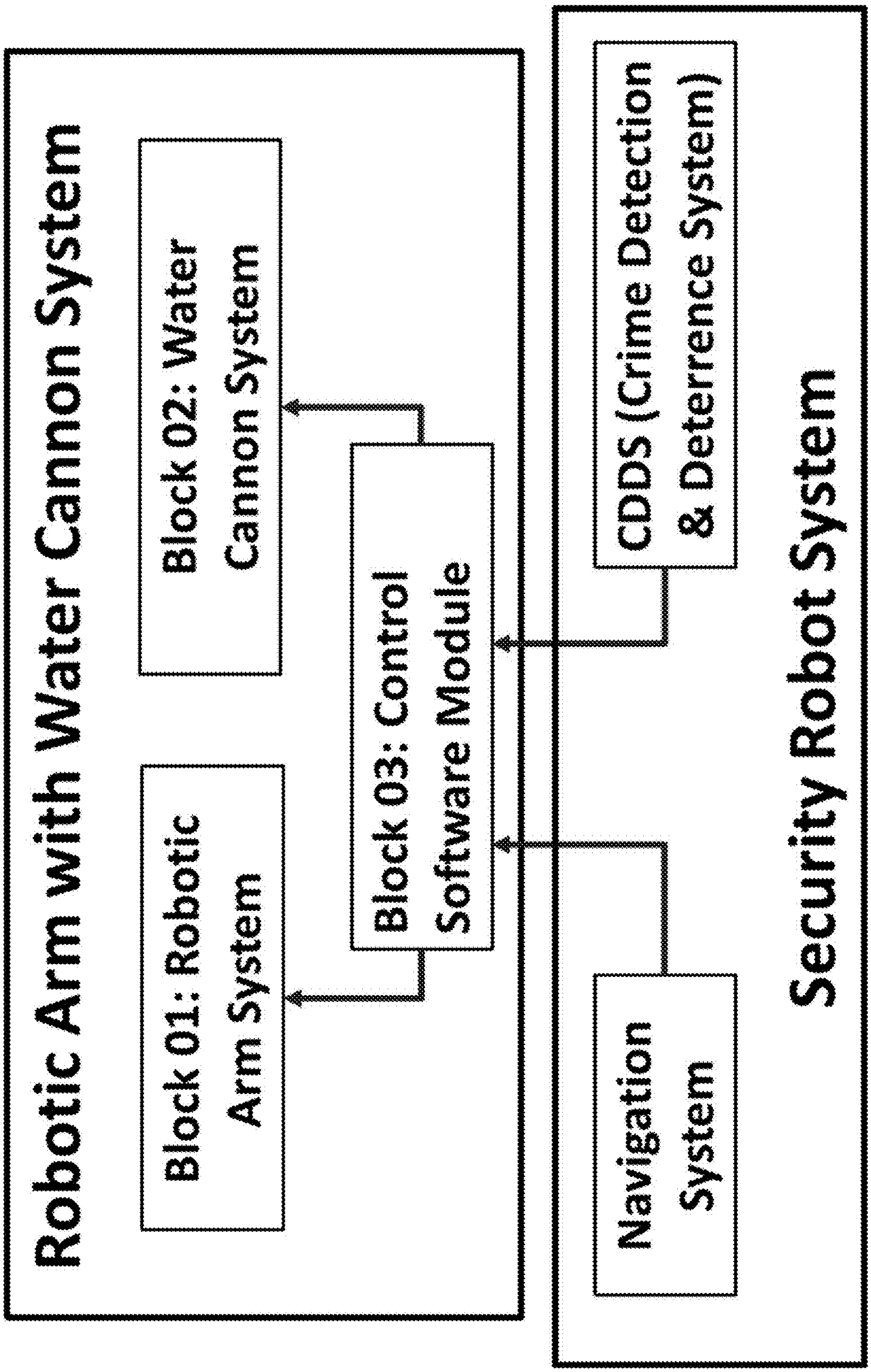
FIG. 1 is a schematic diagram of a security robot system integrated with a robotic arm and water cannon system.

Referring now to FIG. 1, a schematic of a security robot system integrated with a robotic arm and water cannon system is shown. This drawing depicts the functional blocks of the present invention, which includes a robotic arm system (Block 01), a water cannon system (Block 02), and a control software component (Block 03). These components interact with the robotic arm system, the water cannon system, the navigation system, and the CDDS AI system.

Figure 2:
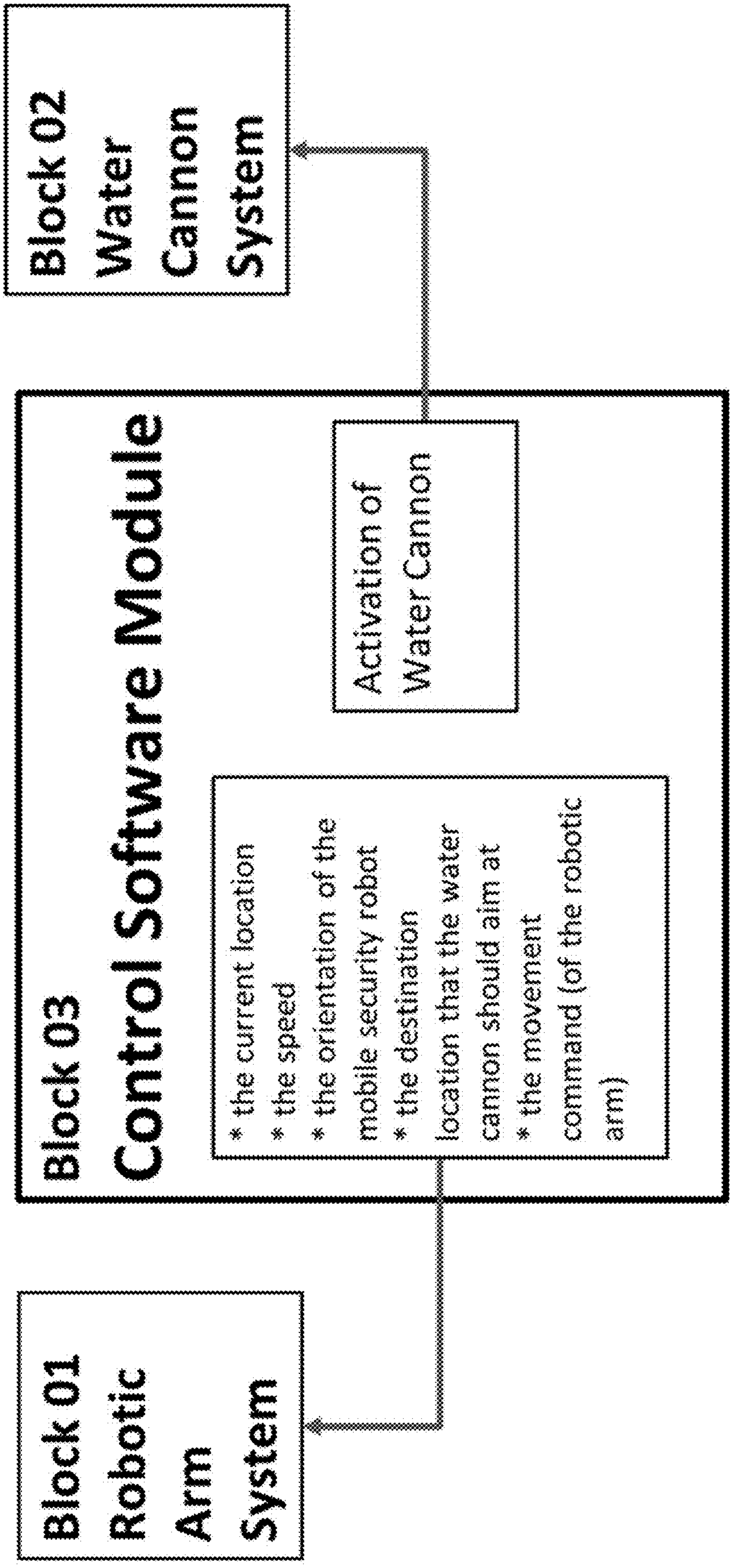
FIG. 2 is a schematic diagram providing more detailed views of the robotic arm and water cannon system.

FIG. 2 provides additional details of the robotic arm system (Block 01). Upon activation, the robotic arm system receives the following inputs:

- The current location, speed, and orientation of the mobile security robot from the control software (Block 03).
- The destination location that the water cannon, as provided by the control software (Block 03).

The water cannon settings, as provided by the control software (Block 03)

Based on the descriptions in the above figures, the present invention involves a pre-installed robotic arm system and water cannon system integrated onto the mobile security robot chassis platform. While navigating autonomously on private property, the Crime Detection and Deterrence System (CDDS) continuously collects audio and video data, analyzes them using AI, and determines whether a potential threat exists. Once a potential threat is detected, the Robotic Arm and Water Cannon System responds accordingly.

More specifically, the security robot may navigate toward the location of the threat or suspect. Sensor devices on the mobile vehicle (or mannequin) compute the location and distance in real time. The robotic arm's movement is controlled by both hardware (mechanical, electrical, or hydraulic systems) and software, enabling it to aim the water cannon at the target location and distance. Once aimed, the water cannon system is activated, responding to the detected threat.

In one embodiment, the choice of robot arm is based on several considerations. Any robotic arm with at least three axes can achieve 360 degrees of freedom, allowing it to point in any horizontal direction and at any vertical angle, from 90 degrees above the horizon to 90 degrees below. However, certain angles may be obstructed by the robotic vehicle itself, depending on the arm's mounting location and the size and shape of the autonomous vehicle. A robotic arm with fewer than three axes may also be used as a cost-saving measure, covering most of the areas a more complex arm could reach. For areas not covered, the autonomous vehicle's movement can be used to position the robot arm at the desired location.

The manufacture of the robotic arm involves the following factors: The robotic arms can either be custom-made by a manufacturer or developed as an ODM extension of existing robotic arm models to reduce manufacturing costs. If the latter option is selected, the following modifications are necessary:

1. The base of the robotic arm must include a bolt-down platform for secure attachment to the vehicle.
2. The far end of the robotic arm must be designed to accommodate various hand attachments or utility tools, as described later.
3. The attachment of the water cannon to the far end of the robotic arm may require a specialized design.

The simplest solution is to use a grasp-type robotic arm to hold the far end of the water hose. This approach does not require customized integration, but the precision of the water stream's direction may be lower than with a more tightly integrated solution. A customized design, where the far end of the robotic arm is directly integrated with the water hose, would provide a more stable and precise water stream direction.

Regarding robotic arm installation, most commercially available robotic arms have a heavy base and often include a bolt-down platform for secure attachment to a flat surface. The preferred location for mounting the robotic arm on the vehicle is near its center of gravity, which is typically close to the geometric center. However, for operational convenience, it may be beneficial to install the robotic arm near the vehicle's edge or corner. This creates an optimization problem that requires balancing both stability and accessibility.

One solution is to design the vehicle such that heavier components are deliberately positioned away from the robotic arm's mounting point to help balance the weight distribution.

Another solution is to position the water tank away from the mounting point. However, this may create a balance issue when the tank is empty. To mitigate this, software control should limit the arm's extension based on the remaining water capacity.

Various aspects of robotic arm hand attachments and related utilities may be considered for certain embodiments. A key advantage of this invention is that the robotic arm can be equipped with various grippers, devices, or tools for different purposes. It is also possible to install multiple robotic arms, allowing different attachments to be used simultaneously without changing configurations during a mission. Below are some illustrative examples of hand attachments for various utilities:

Security and Surveillance: The robotic arm can be equipped with a badge reader, barcode reader, or a camera for license plate or facial recognition. This configuration is ideal for guarding entrances to private properties, such as parking lots or buildings.

Tire Maintenance: The robotic arm can carry tools and supplies for fixing or replacing flat tires, such as a nail remover, socket wrench, jack, compressed air, or a collection of spare tires in various sizes.

Vehicle Maintenance: The robotic arm can carry soap, detergent, water, cloths, and waxes for washing cars, such as employee vehicles in designated parking areas.

Locksmithing: The robotic arm can be equipped with locksmith tools to open locked cars or rooms.

Gardening: The robotic arm can carry an electric saw or cutter for tasks like shaping trees or bushes and removing branches.

Law Enforcement: The robotic arm can be equipped with an armor shield to protect officers in dangerous encounters with armed criminals or explosives.

Explosive Handling: The robotic arm can be equipped with a heavy metal box designed to safely contain explosive materials.

Energy Generation: The robotic arm can extend or attach to a solar panel, which is connected to a battery compartment for recharging the vehicle's battery pack. The panel can be oriented toward the sun to optimize energy collection.

The solar panel can be activated when the vehicle is idle or in patrol mode, ensuring it does not interfere with navigation. During an active mission, the panel may be detached from the robotic arm, allowing it to attach to other hand tools or utilities.

The water cannon infrastructure includes the basic components required to install and deploy the system, either from within the vehicle or a stationary station if mobility is not essential:

Water Tank Container: The water supply is preloaded into one or more containers embedded in the vehicle, referred to as water tanks. Each tank is an independent unit with an entry hole for filling and an outlet for dispensing water.

Water Hose: One end of the water hose connects to the outlet of each water tank.

Motor/Compressor: A motor or compressor generates the high-pressure water stream. This motor can be either electrical or hydraulic.

Attachment to the Robotic Arm: The other end of the water hose is attached (e.g., embedded in or integrated into) the far end of the robotic arm. This allows the robotic arm to guide the water stream's location and distance accurately. The distance is controlled by adjusting the arm's height and angle, as well as regulating the pressure generated by the motor of the water cannon system.

In addition to crime deterrence, the water cannon system can be utilized for various purposes. For illustration, and not by way of limitation, the water cannon system may serve the following functions:

Crime Deterrence: Discourage riots and other disruptive activities.

Street Sweeping: Assist in cleaning streets, highways, homeless areas, and major event cleanups.

Tree Leaf Blowing: Use compressed or pressurized air to blow, stack, and collect tree leaves.

Snow Blowing: Use compressed or pressurized air to clear or stack snow.

Watering Service: Provide watering services for golf courses, large farms, public or private gardens, HOA communities, corporate campuses, and university campuses.

A variety of water mixtures can be used in the water cannon system for crime deterrence and other utilities. In addition to pure water stored in the water tank(s), the vehicle may have additional containers to store different mixtures that can be added before the water cannon dispenses the streams. Depending on the intended purpose, the following mixtures may be considered:

Firefighting: Pure water or fire extinguishing chemicals, either on their own or mixed with water, can be used to enhance firefighting effectiveness.

Crowd Control: Chemicals can be mixed into the water to deter crowds during riot situations. A colored ink, such as red ink, can also be added for effective crowd management.

Military Use: In combat situations, certain chemicals can be mixed into the water, following the guidelines set by the Geneva Conventions.

Car Washing: For commercial applications, soap, detergent, or wax-like chemicals can be mixed with water for car washing missions.

The robotic arm system can also perform more sophisticated car services, although additional authorization may be required for the security robot system to be registered with a private or government organization and gain access to car keys. These services include, but are not limited to:

Car Towing Service

Car Battery Jumping Service

Car Battery Health Check.

Car Battery Recharge Service.

Car Gasoline Emergency Supply.

From the above description, it is clear that this robotic arm and water cannon system is most useful when integrated with the mobility of an autonomous vehicle platform. However, certain applications may not require mobility. For example, a robotic arm stationed at a fixed location, such as a parking lot gate or the main entrance of a building, can still perform various utility services as described earlier. Thus, the invention can be used in both mobile and stationary configurations.

The broad teachings of this disclosure can be implemented in various forms. While particular examples are provided, the true scope of the disclosure should not be limited to these examples, as other modifications will become apparent to those skilled in the art upon reviewing the drawings, the specification, and the following claims.

What is claimed is:

1. A mobile security robot system including a security robot system equipped with a navigation system and an AI-based Crime Detection and Deterrence System (CDDS), comprising:

a robotic arm system (Block 01) configured to move in three or more axes, enabling the arm to achieve a 360-degree range of motion horizontally and a vertical range of +90 degrees to −90 degrees relative to the horizon;

a water cannon system (Block 02) connected to the robotic arm, the water cannon system being capable of discharging a high-pressure water stream; and a control software module (Block 03) interacting with the robotic arm system, the water cannon system, and the navigation system, wherein the control software module is configured to:

determine a location and orientation of the mobile security robot;

analyze inputs from the CDDS to detect an identified threat and direct the robotic arm and water cannon system toward the identified threat; and direct the robotic arm to position the water cannon at an appropriate angle and distance to aim the water stream.

2. The mobile security robot system of claim 1, wherein;

the robotic arm system comprises at least three axes of movement, enabling precise positioning of the water cannon system; and the robotic arm system is mounted to a vehicle at a location close to the center of gravity, or at a location near an edge or corner of the vehicle to optimize operational effectiveness.

3. A method for deploying the water cannon system on the mobile security robot as in claim 1, comprising steps of:

preloading water or a mixture of water and fire-extinguishing chemicals into one or more water tanks embedded in the mobile security robot;

connecting a water hose to the water tanks and routing the water hose to the robotic arm system;

activating a motor or compressor to generate a high-pressure water stream; and directing the robotic arm to aim the water cannon at the location of the identified threat, based on inputs from the control software component.

4. The method of claim 3, wherein the water mixture comprises:

fire extinguishing chemicals, wherein the mixture is used to extinguish fires;

crowd control chemicals, including a colored ink, mixed with water to deter riotous crowds; and water with soap and detergent chemicals for performing car washing operations.

5. The mobile security robot as in claim 1, wherein the robotic arm system further comprises:

a multi-axis robotic arm capable of precise movement, enabling 360-degree horizontal and 180-degree vertical motion;

a water cannon attachment integrated into a far end of the robotic arm, the water cannon attachment being operable to discharge a high-pressure water stream at a specific location and distance determined by the robotic arm's position and angle; and a control interface for controlling the robotic arm's position, the water cannon's angle, and the flow of water through the water cannon system.

6. The mobile security robot as in claim 5, wherein the robotic arm system further comprises:

a customizable hand attachment interface, wherein the robotic arm is configured to carry different tools or devices, including badge readers, cameras, or soap and detergent dispensers, depending on the task.

7. The mobile security robot as in claim 1, wherein the water cannon system further comprises:

a water tank container embedded in the mobile security robot, wherein the water tank has an inlet for filling water and an outlet for dispensing water;

a water cannon comprising a motor or compressor configured to generate a high-pressure water stream, wherein the motor is either electrical or hydraulic;

a hose connected to the water tank, wherein the hose is directed to a robotic arm system capable of adjusting the angle and distance of the water stream; and a control system that receives location and target data from the mobile security robot's navigation system and directs the robotic arm to position the water cannon accordingly.

8. The mobile security robot as in claim 7, wherein:

the water tank container of the water cannon system is configured to store either pure water or water mixed with fire extinguishing chemicals, riot control agents, or car washing detergents; and the water cannon of the water cannon system is configured to deploy various mixtures, including fire-extinguishing agents or crowd control chemicals, depending on the application.

9. A method for operating the robotic arm system and the water cannon system in a mobile security robot system as in claim 7, comprising steps of:

receiving location, speed, and orientation data of the mobile robot from the control software module;

determining a target location for the water cannon to aim at based on inputs from the control software module;

activating the robotic arm to position the water cannon toward the target location, adjusting the angle and distance as necessary; and activating the water cannon to discharge a high-pressure water stream toward the target.

10. The method of claim 9, wherein the water cannon system is deployed in a stationary location, and the robotic arm remains stationary while the water cannon is used for tasks such as crime deterrence or cleaning operations.

* * * * *